United States Patent [19]

Evans

[11] 4,333,695
[45] Jun. 8, 1982

[54] ROLLER BEARING

[76] Inventor: Terence A. Evans, 37 the Coppins, Ampthill, England

[21] Appl. No.: 172,550

[22] Filed: Jul. 28, 1980

Related U.S. Application Data

[63] Continuation of Ser. No. 944,969, Sep. 22, 1978, abandoned.

[30] Foreign Application Priority Data

Sep. 28, 1977 [NL] Netherlands .......................... 7710564

[51] Int. Cl.³ .......................... F16C 19/28; F16C 25/06
[52] U.S. Cl. ................................ 308/211; 308/207 A; 308/214
[58] Field of Search ........... 308/16, 17, 207 R, 207 A, 308/208, 211, 213, 214, 216, 218, DIG. 11

[56] References Cited

U.S. PATENT DOCUMENTS

| 755,992 | 3/1904 | Bower | 308/211 |
| 1,761,490 | 6/1930 | Penner | 308/214 |
| 1,916,233 | 7/1933 | Riblet | 308/DIG. 11 |
| 1,956,289 | 4/1934 | Herrmann | 308/214 |
| 2,098,683 | 11/1937 | Wise | 308/214 |
| 2,195,795 | 4/1940 | Baker | 308/214 |
| 3,689,127 | 9/1972 | Hampp et al. | 308/214 |

FOREIGN PATENT DOCUMENTS 489887 1/1953 Canada .................................. 308/214

Primary Examiner—Richard R. Stearns
Attorney, Agent, or Firm—Eugene E. Renz, Jr.

[57] ABSTRACT

A roller bearing comprising inner and outer annular ring members having confronting inner and outer spaced raceways, the inner ring member having an integral flange confronting the axial ends of the rollers of one row, at least a pair of rows of rollers separated by cages and in line contact with said bearing raceways, a guide flange confronting and guiding the rollers of the other row at the opposite axial end of the inner annular member, sealing means fastened at said one axial end to said outer annular member, characterized in that said guide flange is formed by a substantially cylindrical bearing component fixed in place by a detachable retaining member.

7 Claims, 5 Drawing Figures

ROLLER BEARING

This is a continuation of application Ser. No. 944,969, now abandoned, filed Sept. 22, 1978.

BACKGROUND OF THE INVENTION

The invention relates to a roller bearing comprising an inner and outer race, provided with an integral flange, between which are rows of rollers separated by cages and in line contact with the bearing surfaces, the outer ends of the rollers being guided by guide-flanges, together with sealing means fastened at one end to the outer race, and with the other end bearing on the inner race or parts thereof. A roller bearing of this type is, for example, disclosed in U.S. Pat. No. 3,589,747.

In the known bearing the guide-flanges are formed in the races or integral parts thereof so that on assembling the bearing, in particular on inserting the rollers between the races, it is necessary to move one of the races eccentrically with respect to the other, so that a "crescent-shaped" space is formed between the races and only a limited number of rollers can be used, thus causing a limitation in the capacity of such a bearing.

SUMMARY OF THE INVENTION

The object of the invention is to provide a bearing of the type described in which one is in principle no longer restricted to a limited number of rollers, whereby not only is its performance, that is the service life and load-bearing capacity of the bearing considerably improved or great flexibility obtained, but in addition the introduction of the rollers into or their location in the bearing is simplified. This object is achieved, according to the invention, by at least one guide-flange being formed by a substantially annular or cylindrical component of the bearing fixed in its position by means of a detachable retaining member.

By this means it is now possible to use the optimum number of rollers in assembling this type of bearing, that is to say, to provide in one row more or fewer rollers than in the other row, depending on the anticipated loads, and one is now, in fact, for the introduction of the number of rollers, only dependent on the annular space between the races and the dimensions of the periphery of the bearing-cage. Moreover, the necessary condition of eccentric displacement of one of the races in relation to the other for the purpose of inserting a (limited) number of rollers into the "crescent-shaped" space formed now no longer applies.

For a preferred embodiment the detachable bearing component consists of a bush fitting into the bore of the bearing which is provided with a flanged portion comprising the guide-flange. This embodiment offers advantages, because a screw-thread is applied to the other end of the bearing bush whereby a nut co-operating therewith can be tightened against the end face of the inner race facing away from the flange of the bush. A relatively simple design of guide-flange which is capable of being clamped or adjusted has thus been introduced. In a preferred embodiment according to the invention the bearing bush comprises a bearing surface, the guide-flange for a row of rollers and at the same time means for clamping it against the bearing. This greatly simplifies assembly and the insertion or location of the rollers. In another preferred embodiment a spacer, preferably annular, is located between the end face part of the part of the inner race and a shoulder formed on the outer surface of the bearing bush, whereby the bearing surface for the row of rollers guided by the flange which forms the guide-flange is formed between this shoulder and the inner surface of the flange of the bearing bush. This produces a considerable simplification and improvement in respect of the assembly and in particular the re-adjustability of the bearing.

DESCRIPTION OF THE DRAWINGS

The invention will be illustrated with reference to the accompanying drawings, in which advantages and other features will be emphasised.

DESCRIPTION OF THE PREFERRED EMBODIMENTS

Figure 1:
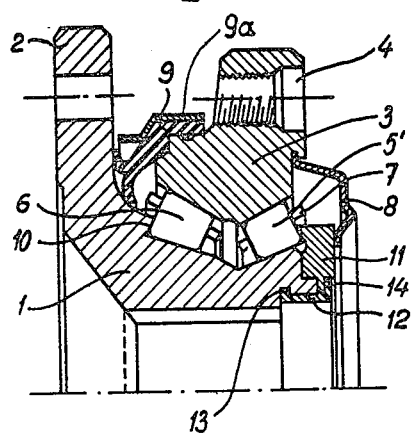
FIGS. 1 to 5 show sections of different embodiments of the roller bearing according to the invention.

The bearing shown in FIG. 1 comprises an inner race 1 with a flange 2 which forms a single whole or is integral therewith for fastening of, for example, a vehicle wheel, and an outer race 3, likewise with an integral flange provided with fixing apertures 4 for the coupling of, for example, parts of the steering gear of the vehicle. Between races 1 and 3 two rows 5' and 6 of taper rollers are located which are separated from each other by cages 7. Furthermore, sealing means 8 and 9 are located on both sides of rollers 5, 6 which at one end are fixed in relation to outer race 3 while at the other end their sealing lips bear on parts of inner race 1. Seal 9 is moreover provided with a protective plate or ring 9a. Guide flanges are used for at least the indirect guidance of the taper rollers and guide flange 10 is formed for this purpose for rollers 6 in the inner race 1. For guiding rollers 5 in this embodiment of the invention annular bearing component 11 is used which is fixed to the bearing by similarly annular retaining member 12. The retaining member has for this purpose axially directed rims 13 and 14, rim 13 fitting into a groove formed in inner race 1 while rim 14 engages behind bearing component 11, so that this—the bearing component forming the guide flange—is firmly held against the end face of inner race 1.

According to the invention it is now possible to use a simple method completely different from that used hitherto for assembling a bearing as in FIG. 1; moreover, a bearing of greater and/or better-adapted load bearing capacity can be obtained with the same dimensions. In the known method the rollers can only be located between races 1 and 2 by displacing one of the races eccentrically with respect to the other, so that a "crescent-shaped" space is formed between them into which a (limited) number of rollers can be introduced.

By then moving one of the races centrally and subsequently inserting the bearing cage between the races and around the rollers, these are evenly distributed in the space between the races. It will be evident that in the known design of bearing it is the "crescent-shaped" space which determines the number of rollers to be inserted and inter alia the performance, at least the load bearing capacity, of the bearing.

By means of the invention not only can the number of rollers be optimised, thus increasing the capacity of the bearing, or making it better adapted to loaded states, but in addition the assembly of such a bearing is greatly simplified. According to the procedure of the invention the row of rollers 6 is first placed on race 1, simultaneously with race 7 or not, whereupon outer cage 3 is pushed over the row and rollers 5 are then located in the immediately adjacent space, simultaneously with a cage 7 or not. The guide flange-forming component of the bearing, 11, is then fixed onto and into the inner race by the fastening or retaining member 12. It will be evident that by means of this procedure the space between the races as well as substantially the dimensions of the periphery of the bearing cage are now the only factors determining the number of rollers 5, 6 to be inserted. The number of rollers in the rows, moreover, need not be the same; what matters is that a uniform distribution of the load is achieved by means of the rollers. Theoretically, therefore, one row should be able to contain twice as many rollers as the other row. The points mentioned are dependent on the specific loading curve expected with this special type of bearing (races with integral flanges). Furthermore, the use of loose, annular guide flanges is well known as such. This bearing component, however, is only used in conventional cylindrical bearings, that is, bearings without integral flanges, and, moreover, an annular guide flange of this type forms a sub-component which is completely detached or separate from the bearing and is not functional until after the bearing is mounted into a structure.

It should be noted that the sub-components in the exemplary embodiments shown in FIGS. 2 to 5 which coincide with those of the embodiment of FIG. 1 are given the same reference numerals, but with "dashes" added.

Figure 2:
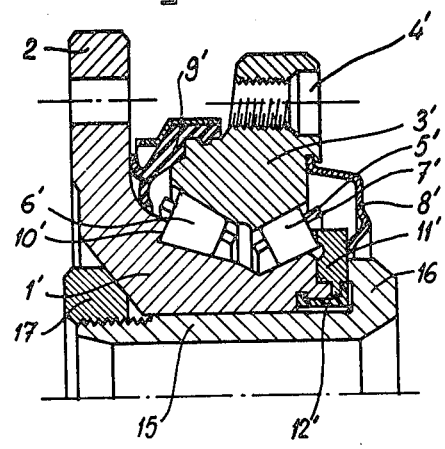

The embodiment of FIG. 2 differs from that of FIG. 1 in the use of a supplementary retaining member in the form of a bearing bush 15 inserted in the bore of the bearing which is provided on one side with a substantially radially directed flange 16 one portion of which bears on annular bearing component 11'. At the other end bearing bush 15 is provided with a screw thread into which fits a nut 17 clamped against inner race 1'. This makes it possible by tightening nut 17 to a greater or lesser extent to pre-stress the bearing via a suitable bearing ring 11', thus exerting on the rollers a greater or lesser degree of pressure in the axial direction so that undesirable play in the bearing is eliminated.

Figure 3:
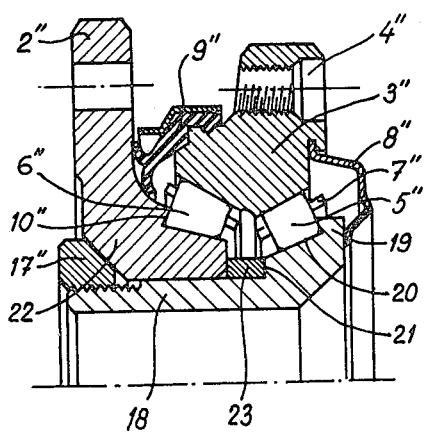

FIG. 3 shows a preferred embodiment in which the guide flange-forming component of the bearing is integral with a cylindrical bearing bush 18 provided with a guide flange 19 constituting a peripheral portion of the flange of this bearing bush. Moreover inner race 20 for rollers 5" is formed in bearing bush 18 between it, the guide flange-forming component 19 and a shoulder 21. It is preferred that an annular spacer 23 is located between the shoulder 21 and the end face of inner race 22 whereby accurate adjustment and if necessary pre-stressing of the bearing can be effected. An additional advantage of the embodiment shown in FIG. 3 is that in this the inner race 22 consists of two parts, so that the requirement for a very accurate axial width dimension for an inner race of this type can be entirely dispensed with, since differences in these dimensions can be taken up by spacer 23, which has a shape and dimensions which are in other respects adapted thereto. Furthermore, this bearing may easily be converted from a bearing for a non-driven wheel to a bearing for a driven wheel by providing bearing bush 18, for example as shown in FIG. 5, with one or more keyed connections or the like power transmitting coupling means.

Figure 4:
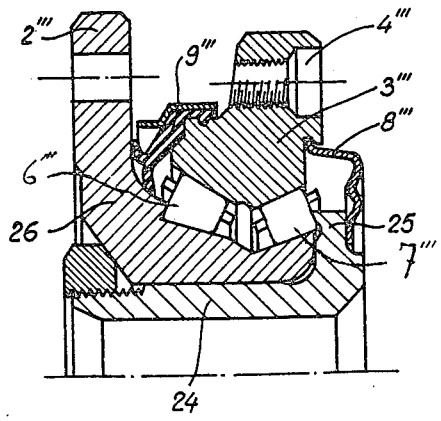

The embodiment of FIG. 4 coincides in many respects with that of FIG. 2 with, however, the difference that the part forming the guide flange for the rollers 7 here forms a single entity with the bearing bush 24.

Guide flange 25 thus consists substantially of a peripheral portion of the flange of bearing bush 24, the said flange fitting against the end face of inner race 26 with a given tolerance.

Figure 5:
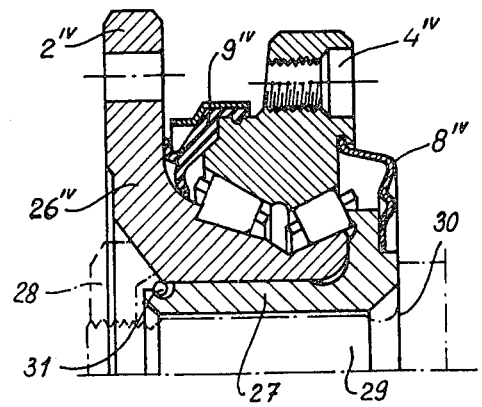

The embodiment of FIG. 5 largely coincides with that of FIG. 4 except that the screw thread for nut 28 is cut on a shaft to be mounted, 29, instead of on bearing bush 27. The shaft 29 further comprises a shoulder 30 bearing on bush 27. For a mounting more reliable in operation bearing bush 27 is provided with a locking ring 31 which is located on the side remote from the guide flange. This embodiment is particularly suitable for a driven wheel, for which purpose the bearing bush 27 is provided on its inner surface with keys or the like coupling means.

In all the embodiments shown the free race 11 or the flanged part of bearing bush 15, 18, 24 or 27 forming a guide flange advantageously forms a supporting and sealing surface for sealing means 8.

I claim:

1. A hub bearing assembly comprising a first outer annular ring and an inner ring member, the outer ring having a pair of axially spaced outer raceways and said inner ring member having a pair of spaced inner raceways confronting the outer raceways, a plurality of rollers arranged in two rows in the annular space between the outer ring and inner ring member, said rows of rollers separated by cages and in line contact with said bearing raceways, said inner ring member comprising at least a pair of inner ring elements, one of said inner ring elements having said inner raceways thereon and an integral first flange confronting the axial ends of the rollers of one row, the other inner ring element having guide flange means confronting and guiding the rollers of the other row at the opposite axial end of said inner ring member, said other inner ring element extending axially so that its outer free terminal end opposite said guide flange means is disposed adjacent said first flange of said one inner ring element, sealing means fastened at one axial end to said outer annular ring and means including a detachable retaining member cooperable with the terminal end of said other ring element for securing said inner ring elements in assembled relation and providing a means for preloading said bearing.

2. A hub bearing assembly as claimed in claim 1 wherein said detachable retaining member comprises a nut threadedly mounted on external threads on said other inner ring element at said terminal thereof adjacent said first flange and engageable with said one ring element adjacent to said first flange.

3. A hub bearing assembly as claimed in claim 2 wherein said other inner ring element has a beveled undercut which is engageable by said nut member.

4. A hub bearing assembly as claimed in claim 1 including a shaft member on which the bearing is mounted having a threaded portion and wherein said detachable retaining member comprises a nut threadedly engageable on a threaded portion of said shaft member engageable with said one inner ring element.

5. A hub bearing assembly as claimed in claim 4 including a locking ring engageable in a groove in said other inner ring element adjacent said first flange.

6. A hub bearing assembly comprising a first outer annular ring and and inner ring member, the outer ring having a pair of axially spaced outer raceways and said inner ring member having a pair of spaced inner raceways confronting the outer raceways, a plurality of rollers arranged in two rows in the annular space between the raceways of said outer ring and inner ring member, said rows of rollers separated by cages and in line contact with said bearing raceways, said inner ring member comprising at least a pair of inner ring elements, one of said inner ring elements having an integral first flange confronting the axial ends of the rollers of one row, the other ring element having a guide flange at one axial end opposite said integral first flange of said one ring member and extending axially so that its terminal end is disposed adjacent said first flange, an annular bearing component engaging between the guide flange of said other ring member and confronting and adapted to engage the axial ends of the rollers of said other row of rollers, a nut member threadedly engageable on the outer terminal end of said other ring element and engageable with said one ring element, actuation of said nut member in one direction operable to prestress the rollers through said annular bearing component in an axial direction to take up undesirable play in the bearing.

7. A hub bearing assembly as claimed in claim 6 wherein said bearing component is supported at one axial end of said one inner ring element by a fastening member.

* * * * *